(No Model.)
F. W. SNOW.
SWITCH STAND.
No. 375,900. Patented Jan. 3, 1888.
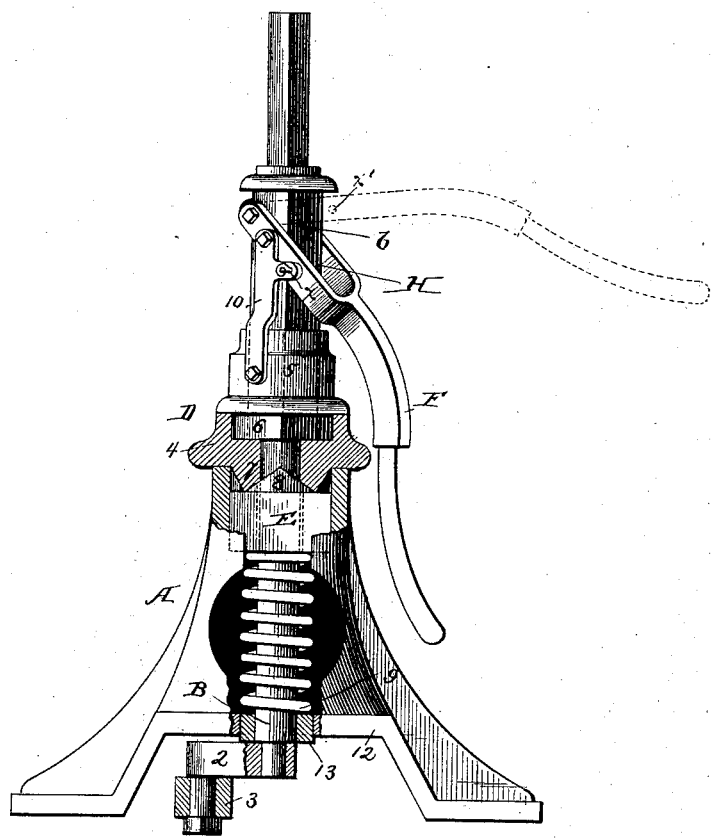

UNITED STATES PATENT OFFICE.

FRED W. SNOW, OF RAMAPO, NEW YORK.

SWITCH-STAND.

SPECIFICATION forming part of Letters Patent No. 375,900, dated January 3, 1888.

Application filed April 27, 1887. Serial No. 236,339. (No model.)

*To all whom it may concern:*

Be it known that I, FRED W. SNOW, a citizen of the United States, residing at Ramapo, Rockland county, New York, have invented certain new and useful Improvements in Switch-Stands, of which the following is a specification.

My invention relates to that class of railway-switch stands in which a spring is used to resist the turning of the shaft after the adjustment of the switch, and in which there is an operating-lever for locking and turning the shaft; and the invention consists in certain means, hereinafter fully set forth, for relieving the stand of the pressure of the spring and for securing the lever in its locked position.

The drawing illustrates in vertical section a switch-stand embodying my improvements.

The general construction and operation of the stand is substantially as in the stand patented to me June 23, 1885, No. 320,507, in which there is a base, A, a target and switch-shaft, B, having a crank, 2, at the lower end connected with the rod 3, extending to the switch, a clutch, D, consisting of a part, 4, revolving at the head of the stand, and a part, 5, turning with and sliding on the shaft B, and provided with an angular projection, 6, extending into a socket in the part 4, teeth or cams 7 on the lower side of the revolving part 4, engaging with like teeth or cams 8 on a block, E, sliding in guides on the stand and bearing on a spring, 9, and a lever pivoted to the shaft and connected by links 10 to the sliding part 5 of the clutch. By swinging the lever F out to a horizontal position, the part 5 of the clutch is disengaged from the part 4 and the switch-shaft is readily turned to set the switch, the part 4 remaining stationary. On lowering the lever the parts 4 5 are engaged, and the shaft cannot be turned without the exertion of sufficient power to revolve the part 4 and cause the teeth 7 to ride over the teeth of and force down the block E against the pressure of the spring. In the said patented stand the spring 9 bears on a cross-piece, 12, of the stand, which must act as a bearing to resist the pressure imparted to the block E. To avoid the necessity of thus providing a bearing for the spring upon the stand, I provide the shaft B with a shoulder, sleeve, or washer, 13, which may be secured on the shaft, either fixedly or to turn, at a point above the crank 2, or it may form a part of the crank, and the spring 9 is confined between this shoulder and the block E, so that it has no bearing whatever upon the stand.

The opening in the base of the stand through which the target-shaft B extends is enlarged, so as to permit the ready passage of the shoulder or washer 13, and the latter is preferably located on the shaft within said opening, thereby forming also a bearing for the shaft and effectually preventing lateral play of the latter at that point.

The part 5 of the clutch D preferably slides upon and turns with a rectangular sleeve, H, detachably secured to the target-shaft B in any suitable manner, as by a bolt, $b$, and the lower end of the sleeve bears upon the upper face of the part 4 of the clutch, thereby preventing the downward movement of the shaft.

One of the main advantages of the above-described construction is that the shaft B can be withdrawn from the stand by removing the bolt $b$ or other fastening and turning the stand on its side and drawing the shaft from the bottom, with the spring, shoulder 13, and block E in position and replaced, thus avoiding the necessity of adjusting the spring and block after the shaft is inserted in position.

In the said patented stand the lever F, when down, is locked to an arm projecting from the part 5 and extending through a slot in the lever F. To avoid the necessity of slotting the lever and the injuries resulting from the liability of the projecting locking-arm being struck and broken, I make in a part of one of the links 10 and in a part of the lever F openings $x$ $x'$, which coincide when the lever F is down in the position shown in the drawings, so that the bow of a padlock may be passed through the same and the two locked together in such manner that the lever cannot then be raised.

I do not limit myself to the precise arrangement of coinciding openings shown, as they may be made at any points in the link and lever which will coincide when the lever is down or in projections on the lever or link.

I claim—

1. The combination, with the crank-shaft of a railway-switch stand and with a spring arranged to resist the rotation of said shaft, of a bearing for the spring carried by said shaft, said bearing fitting within and adapted to pass freely through a recess in the base of the stand, whereby the shaft, spring, and bearing may be readily withdrawn from and replaced within the stand without removing or adjusting any of the parts thereof, substantially as and for the purpose described.

2. The combination, with the stand having an opening in its base, of a crank shaft, a yielding cam-block sliding in bearings on the stand, a spring encircling the crank-shaft and bearing at one end on the block, and a bearing for the opposite end of the spring, carried by the crank-shaft and adapted to pass freely through said opening, substantially as described.

3. The combination, with the crank-shaft, clutch, cam-block, and spring, of a collar, 13, on the shaft and a stand having a recess in its base to receive said collar, substantially as described.

4. The combination, in a switch-stand, of a shaft, operating-lever, clutch, and link connecting the lever and part of the clutch, the link and lever having coinciding openings, substantially as and for the purpose set forth.

In testimony whereof I have signed my name to this specification in the presence of two subscribing witnesses.

FRED W. SNOW.

Witnesses:
A. W. WRIGHT,
W. G. EASTON.